US010980264B2

(12) United States Patent
Lane et al.

(10) Patent No.: US 10,980,264 B2
(45) Date of Patent: Apr. 20, 2021

(54) THERMALLY INHIBITED AGGLOMERATED STARCH

(71) Applicant: Corn Products Development, Inc., Sao Paulo (BR)

(72) Inventors: Christopher Lane, Bridgewater, NJ (US); Wajira S. Ratnayake, Somerset, NJ (US); Tarak Shah, Raritan, NJ (US); Judith M. Vaz, Piscataway, NJ (US)

(73) Assignee: Corn Products Development, Inc., Westchester, IL (US)

( * ) Notice: Subject to any disclaimer, the term of this patent is extended or adjusted under 35 U.S.C. 154(b) by 272 days.

(21) Appl. No.: 15/402,915

(22) Filed: Jan. 10, 2017

(65) Prior Publication Data

US 2018/0192683 A1 Jul. 12, 2018

(51) Int. Cl.
*A23L 29/219* (2016.01)
*C08B 30/06* (2006.01)
*C08L 3/02* (2006.01)
*C08B 30/12* (2006.01)

(52) U.S. Cl.
CPC ............ *A23L 29/219* (2016.08); *C08B 30/06* (2013.01); *C08B 30/12* (2013.01); *C08L 3/02* (2013.01)

(58) Field of Classification Search
CPC ....... A23L 29/219; C08B 30/06; C08B 30/12; C08L 3/02
See application file for complete search history.

(56) References Cited

U.S. PATENT DOCUMENTS

| 5,725,676 | A | 3/1998 | Chiu et al. |
| 5,932,017 | A | 8/1999 | Chiu et al. |
| 6,010,574 | A | 1/2000 | Jeffcoat et al. |
| 6,221,420 | B1 | 4/2001 | Thomas et al. |
| 6,231,675 | B1 | 5/2001 | Chiu et al. |
| 6,322,818 | B1 | 11/2001 | Rebier |
| 6,451,151 | B1 | 9/2002 | Traise |
| 6,858,245 | B2 | 2/2005 | De Coninck |
| 2010/0266743 | A1 | 10/2010 | Chen et al. |
| 2013/0209630 | A1 | 8/2013 | Chen |
| 2013/0309386 | A1 | 11/2013 | Han et al. |
| 2014/0287131 | A1* | 9/2014 | Drew .................. A23L 3/10 426/622 |

FOREIGN PATENT DOCUMENTS

| CA | 2887354 A1 | 4/2014 |
| EP | 1166645 A2 | 1/2002 |
| EP | 2116137 A2 | 11/2009 |
| EP | 2829182 A2 | 1/2015 |

(Continued)

OTHER PUBLICATIONS

Damidaran et al (ed.) Fennema's Food Chemistry 4th Edition CRC Press 2008, pp. 131, 364 and 368 (Year: 2008).*

(Continued)

*Primary Examiner* — Kelly J Bekker

(57) ABSTRACT

Methods for preparing thermally inhibited starch agglomerates are disclosed. Thermally inhibited starch agglomerates prepared by this method provide a higher viscosity over thermally inhibited starches that are not agglomerated but are thermally inhibited in the same manner as the thermally inhibited starch agglomerates.

15 Claims, 3 Drawing Sheets

(56) References Cited

FOREIGN PATENT DOCUMENTS

GB          2506695 A      4/2014
WO     WO2014/053 A1    4/2014

OTHER PUBLICATIONS

Guo, P. et al; Study of the Agglomerate Structure in Wheat Starch Retrogradiation; SAXS, China Food Additives, pp. 116 (2011), abstract only.
Martin, I. Crosslinking of Starch by Alkaline Roasting; Journal of Applied Polymer Science 11(7), pp. 1283-1288, 1967.
Shinde, S.V. et al. Soft Wheat Starch Pastinhg Behavior in Relation to A- and B-type Granue Content and Composition; Cereal Chem. 80(1):91-98, 2003.

* cited by examiner

THERMALLY INHIBITED AGGLOMERATED STARCH

BACKGROUND OF THE INVENTION

Field of the invention. The present invention is directed towards physically modified starches and their applications in food products. More specifically, the present invention is directed towards a method of improving the viscosity of thermally inhibited, starch-based texturizers and application of those texturizers in food products.

Starch is a major raw material used in the food industry for its good thickening and gelling properties. However, in a wide range of starch applications, native starches alone cannot be used because of their lack of process tolerance and inability to deliver desired properties such as solubility, viscosity, texture and clarity. For example, in food processing, heat, shear and/or extreme pH, especially acidic pH, tend to disrupt starch granules and disperse the starch in the food. As such, unmodified native starches are generally unsuitable for use in processed foods. In order to overcome these deficiencies, native starches are often modified using any of a variety of starch modification techniques, namely, chemical, physical, and/or enzymatic modifications.

Chemical modification of starch molecules is often used to achieve the above mentioned desired properties. Numerous methods of chemically modifying starch have been developed over the past century to attain these coveted functional properties. Such modification techniques include acid conversion, crosslinking (e.g., with $POCl_3$), and derivatization (e.g., acetylation, esterification, etherification, and propylation (e.g., PO modification)), among others. These modifications result in starches having any of a variety of desirable properties, including process tolerance, high viscosity, better thickening power, more resistance to gelatinization, and retrogradation stability compared to native starches.

For example, starches modified by chemical crosslinking are better able to withstand the effects of high temperature processing and high shear. Chemically crosslinked starches are prepared by modifying the starch granule with difunctional reagents (e.g., phosphorus oxychloride, sodium trimetaphosphate, adipic anhydride, acetic anhydride and epichlorohydrin). Chemically crosslinked starches have much better tolerance to processing treatments such as heat, shear, and pH extremes, and possess viscosity stability throughout the processing operation, as well as provide a desirable smooth texture and shelf life of the food, compared to their native counterparts.

In addition to chemical modification or alternatively, by treating at specific moisture and temperature conditions, certain properties of starch can be physically altered. Such physical processes provide starch with functional properties similar to those obtained by chemical modification. Physical modifications are often desired over chemical modifications due to growing consumer preference for non-chemically modified food ingredients. Usually, starch is physically modified by subjecting granular starch to specific heat and moisture conditions for a duration sufficient to develop granular structural changes adequate to achieve the desired functionality.

Two basic types of hydrothermal treatments are commonly employed in modifying the physiochemical properties of starch. Under these methods, starches having specific levels of moisture are heated for a specific period of time without causing a significant level of starch gelatinization (i.e., the starch granule retains its morphology). Treatment of starch with excess or intermediate moisture (e.g., about 40 wt % to about 80 wt % or 90 wt % moisture) at a temperature above the glass transition temperature but below the gelatinization temperature is referred to as "annealing" (ANN). The gelatinization temperature varies depending on the source of the starch, with starch gelatinization typically occurring over a temperature range. For example, the gelatinization temperature of native (i.e., unmodified) potato starch is from about 56° C. to about 66° C., whereas the gelatinization temperature of native corn starch is from about 62° C. to about 72° C. The term "heat-moisture treatment" (HMT) refers to starch heat treated at a temperature above its gelatinization temperature but with insufficient moisture to gelatinize (i.e., heat treated with limited moisture, which can be present in an amount of about 10 wt % to about 30 wt % moisture).

As noted above, these two types of physical modifications occur at temperatures above the glass transition temperature and either below (ANN) or above (HMT) the gelatinization temperature of the relevant starch, depending on the specific moisture content used for the treatment (e.g., excess moisture as in a slurry for ANN, or no or only a small amount of added moisture for HMT). In particular, hydrothermal treatment can be used to increase the gelatinization temperature, enzymatic susceptibility, solubility, swelling volume, and changes in X-ray diffraction patterns. The changes in these parameters vary depending upon the source of the starch and hydrothermal treatment conditions.

A third type of thermal modification of starch is thermal inhibition. Thermal inhibition is well known in the art and is exemplified in U.S. Pat. Nos. 5,718,770; 5,932,017; 6,231,675; 6,451,121; 8,268,989; 8,471,003; and 8,759,511, hereby incorporated by reference. Thermal inhibition differs from ANN and HMT in that in the thermal inhibition process the moisture content of the starch granule is rendered at least substantially anhydrous, and the starch granule is then heat treated. In other words, dry thermal inhibition is a technology that involves heating substantially anhydrous, granular starch at elevated temperatures (e.g., 125° C. to 180° C.), which can occur in one embodiment under alkaline conditions. Thermally inhibited starches obtained by this process have characteristic functional properties such as limited granular swelling and less viscosity breakdown during pasting than native starch. Because these properties and functionalities of thermally inhibited starches are similar to those of chemically crosslinked starches, thermally inhibited starches, which lack chemical additives, are preferred for food applications.

Thermally inhibited starches are generally recognized as functional, native starches because the improved functionalities of the product are derived from a non-chemical process. Traditionally, thermally inhibited starches are made so that the starch granules are retained in the end product.

Like chemically crosslinked starch, thermally inhibited starch provides thickening in food products. The degree of thermal inhibition depends upon the viscosity required for a particular food application. In general, the higher the temperature at which the starch is cooked the greater the degree of starch inhibition In one aspect, the present invention is directed towards such thermally inhibited starches, specifically, those without any chemical modification.

Starches are thermally inhibited in a process that results in the starch granule structure becoming resistant to hydrothermal destruction (hereinafter referred to as "inhibited" or "thermally inhibited") without addition of chemical reagents. The degree of thermal inhibition required depends upon the desired functionality sought by the thermally inhibited starch in the food (e.g., thickening, gelling, extending, etc.), as well as the particular processing conditions used to prepare the foods and the degree of functionality desired. These thermally inhibited starches have functional characteristics similar to chemically crosslinked starches (e.g., process tolerance, improved viscosity) but differ in that the onset of gelatinization temperature is lower, particularly when the starches are moderately or highly inhibited.

During cooking of certain native starches, such as waxy starches, the granules are gelatinized, a peak viscosity is reached, and then the viscosity begins to decrease as the starch granules breakdown and the starch polymers solubilized. For waxy starches, this typically results in a starch paste that is cohesive or runny. In contrast, when thermally inhibited starches are cooked, the starch granules are more resistant to structural breakdown, resulting in less or no viscosity breakdown, compared to native starches which are not thermally inhibited. This resistance to breakdown results in what is subjectively considered a non-cohesive, or "short" textured paste, meaning that the gelatinized starch tends to be salve-like and heavy in viscosity rather than runny or gummy.

Depending upon the extent of heat treatment, various levels of inhibition can be achieved. For example, higher viscosity products with little breakdown as well as highly inhibited, low viscosity products with no breakdown can be prepared by the thermal inhibition process described herein. Generally speaking, the degree of thermal inhibition varies based upon the processing conditions, such as temperature, time and pH. The higher the degree of inhibition, the greater the process stability of the product (i.e., lower paste viscosity breakdown with continued heating and/or shear applied to the starch paste). However, high levels of inhibition result in substantially low paste viscosities, limiting the application of thermally inhibited starches in certain food products. Attempts have been made to improve paste viscosities, color and flavor of thermally inhibited starches by refining the base starch to remove traces of proteins and lipids. Unfortunately, viscosity improvements obtained by such refinements are marginal at best.

Food products which are to be thickened or gelled—with or without heating—can be prepared by adding thermally inhibited non-pregelatinized or pregelatinized granular starch to one or more of the food ingredients prior to or during processing of the food ingredients. Food products can also be extended by replacing or partially replacing one or more of the ingredients typically used in the food (e.g., fat, protein, and the like) with thermally inhibited starch. A mixture of thermally inhibited starches, including granular non-pregelatinized and granular pregelatinized starches, may also be used.

In starch pasting (measured by either a Brabender® Micro Visco Amylograph or a Rapid Visco Analyzer), paste viscosity develops when starch granules absorb water, resulting in granular swelling. Thermal inhibition prevents the breakdown of these swollen granules, thereby impeding or reducing viscosity breakdown after reaching their fully swollen state. It is well recognized that a combination of factors (e.g., the degree of starch granule swelling, the swollen granule's ability to deform without destruction and leaching of starch polymers, the size and shape of the swollen granule and its rigidity, and the degree of friction between swollen starch granule surfaces) affect the paste viscosity of a given starch.

Thermally inhibiting a starch does not guarantee that it will provide the desired functionality needed in the food product. For example, thermally inhibited starches often provide lesser paste viscosities than chemically modified starches. Accordingly, there remains a need for thermally inhibited starches having even greater viscosity than those commercially available.

BRIEF SUMMARY OF THE INVENTION

In accordance with the present invention, the viscosity of thermally inhibited starches is increased in a process whereby the resultant product has a greater viscosity than current commercially available thermally inhibited starches. This resultant product is in the form of starch agglomerates which are thermally inhibited. The thermally inhibited starch agglomerate is prepared by mixing a starch binding agent and starch granules together to at least partially coat starch granules and to form starch agglomerates. The agglomerates are dehydrated to anhydrous or substantially anhydrous. The dehydrated starch agglomerates are then heat treated at a temperature of about 100° C. to about 200° C. for up to about 20 hours thereby thermally inhibiting the starch agglomerates. These thermally inhibited starch agglomerates have a higher viscosity than that of non-agglomerated thermally inhibited starch granules derived from the same native starch as the starch granules present in the starch agglomerates, wherein the thermally inhibited starch granules and thermally inhibited starch agglomerates have been thermally inhibited in the same manner.

The starch binding agent, in one aspect of the present invention, is a solubilized starch. The starch binding agent may be derived from the same native starch as the starch granules. In another aspect of the present invention, the starch bind agent may be derived from a different native starch than that of the starch granules.

The solubilized starch used as the binding agent can be modified in a variety of ways. For example, the solubilized starch can be physically modified; at least partially gelatinized and dispersed. Further, the solubilized starch can be derived from a modified starch. Different modified starches can be utilized, including enzymatically modified starch and chemically modified starch. Other methods of solubilizing starch such that it would be effective to bind starch granules are known in the art.

The starch binding agent for use in the present invention may be pH-adjusted prior to mixing with the starch granules by dispersing the starch binding agent in a buffer, thereby rendering the starch binding agent substantially neutral or slightly alkaline prior to mixing with the starch granules.

Like the starch binding agent, the starch granule may optionally be a modified starch. Different modified starches can be utilized for both the starch binding agent and the starch granules, including enzymatically modified starch and chemically modified starch. In one aspect of the invention, both the starch binding agent and the starch granules are not chemically modified.

Various starch bases may be used as the starch binding agent and the starch granules. In one embodiment, the starch granules are waxy starch granules.

Like the starch binding agent, the starch granules may optionally be pH-adjusted prior to mixing with the binding agent by dispersing the starch granules in a buffer, thereby rendering the starch granules substantially neutral or slightly alkaline. In one embodiment, the starch granules are adjusted to a pH of about neutral or greater prior to mixing with the starch binding agent.

The amount of starch binding agent used to form starch agglomerates can vary. Preferably, the amount of starch binding agent used is about 0.5 wt % to about 50.0%, based on total weight of the starch granules.

The starch binding agent and starch granules can be mixed together by making a slurry of the starch binding agent and the starch granules. In another embodiment, the starch binding agent and the starch granules can be mixed together by spraying the starch binding agent onto the starch granules. In yet another embodiment, the base for the starch binding agent and the starch granules may be mixed and processed such that the starch binding agent is solubilized and at least partially coats the starch granules during processing. In this embodiment, the base for the starch binding agent would need to differ from the starch granules and be less robust to the processing, such as having a lower gelatinization temperature.

The present invention further provides thermally inhibited agglomerated starch obtained according to the method described herein. Further, the present invention includes food products containing thermally inhibited agglomerated starch obtained according to the method described herein.

Throughout the specification, unless the context clearly indicates otherwise, the phrases "in one aspect", "in one embodiment" and the like do not necessarily refer to the same embodiment(s), though it may. The phrases "in another embodiment", "in yet another embodiment", "in another aspect", "in yet another aspect", and the like do not necessarily refer to a different aspect (embodiment), although it may. Thus, as describes below, various aspects (embodiments) of the invention may be readily combined without departing from the scope or spirit of the invention.

DETAILED DESCRIPTION OF THE INVENTION

Figure 1:
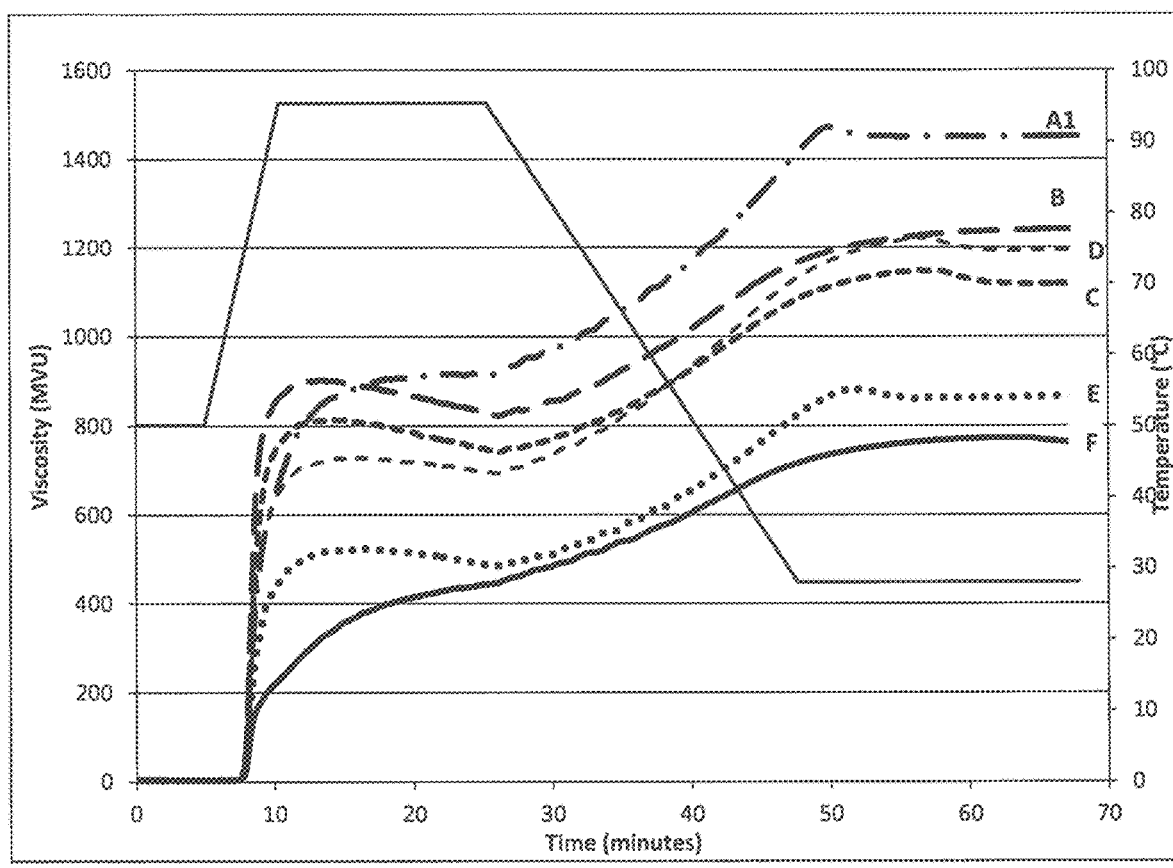
FIG. 1 is a graph illustrating Brabender pasting profiles of various starches prepared using a lab-scale process.

Provided herein is a method of improving the viscosity of thermally inhibited starches. According to the present method, starches manufactured by at least partially coating starch granules to form agglomerates and subsequently thermally inhibiting the agglomerated starch results in a product having a greater viscosity than the same starches which are thermally inhibited and either not agglomerated or subsequently agglomerated.

For the purpose of the present invention, a "thermally inhibited starch agglomerate" means starch granules which are mixed with a binding agent to at least partially coat the granules and form starch agglomerates, then dehydrated to anhydrous or substantially anhydrous, and heat-treated to result in thermally inhibited starch agglomerates. The resultant starch agglomerate prepared by this process includes both individual starch granules at least partially coated with the binding agent, and agglomerates of two or more starch granules. The proportion of starch agglomerates to individual starch granules is dependent upon the process conditions and formulation used.

Starches useful in the present invention may be derived from any native source, including without limitation, banana, corn (maize), pea, beans, lentil, potato, sweet potato, yam, barley, wheat, rice, sago, amaranth, tapioca (cassava), sorghum, rye, oat, canna and arrowroot, as well as high amylose and waxy versions thereof. Preferred starches are low amylose or waxy starches. As used herein, high amylose starch is intended to mean having at least 50% amylose, in another embodiment at least 70% and in yet another embodiment at least 80% amylose by weight of the starch. Low amylose starches are those starches which are not high amylose starches and include waxy starches. As used herein, waxy is intended to mean having no more than 5% amylose, in another embodiment no more than 3% and in yet another embodiment no more than 1% amylose by weight. Unless specifically distinguished, references to starch in this description are also meant to include their corresponding flours.

As used herein, native starches refer to those found in nature, and do not include chemically modified starches. Native starches are starch granules which have been isolated from their plant source without altering their chemical structure.

Prior to agglomeration, native starch granules for use in the present invention can optionally be enzymatically, physically (e.g., annealed, heat-moisture treated), or chemically modified (e.g., crosslinked) as known in the art. However, unmodified native starch granules are also suitable for agglomeration according to the present invention.

Starch granules for use in the present invention can also optionally be buffered. Native starch granules have a natural pH of about 4.0 to about 6.5. As used herein, substantially "neutral" covers the range of pH values around 7 and is meant to include from about pH 6.5 to about pH 7.5. Although starches may be treated at their natural pH, the preferred pH of the starch is at least 7.0. Typically, pH ranges are from about 7.0 to about 10.5, preferably about 7.0 to about 9.5. In one embodiment, the pH is slightly alkaline in the range of 7.5-8.5. At a pH above 12, gelatinization occurs more easily; therefore, pH adjustments below 12 are more effective.

To adjust the pH of the starch, the starch granules may be slurried in water or other suitable aqueous medium, typically in a ratio of about 1.5 to about 2.0 parts water to about 1.0 part starch. The pH may then be raised by addition of any suitable base. In alternative methods of adjusting the pH, either a base or buffer solution may be sprayed onto the powdered starch until the starch attains the desired pH, or an alkaline gas such as $NH_3$ can be infused into the starch. Textural and viscosity benefits of the thermal inhibition process are enhanced in the neutral or slightly alkaline pH range. Higher pH levels may be used, but tend to increase browning of the starch during the heating step.

For food applications, suitable food grade bases useful in the pH adjustment step include sodium hydroxide, sodium carbonate, calcium carbonate, calcium hydroxide, potassium carbonate, potassium citrate, sodium citrate, and potassium hydroxide. These bases may also include any other base approved for food use under Food and Drug Administration laws or other food regulatory laws. Bases not approved for food use under these regulations may also be used, provided they may be washed from the starch so that the final product conforms to good manufacturing practices for food use. A preferred food grade base is sodium carbonate, sodium citrate, or tri-potassium citrate.

Once pH adjustment of the starch granule is completed (or alternatively, for starch granules in which no pH adjustment is desired), the starch granule is mixed with a binding agent to at least partially coat starch granules and to form starch agglomerates. The present invention provides a novel approach to improving the functionality, particularly the viscosity, of starches by at least partially agglomerating starch granules using a starch-based binding agent to at least partially coat and bind the granules together. Such starch agglomerates, when thermally inhibited, have improved or increased viscosity compared to non-agglomerated, thermally inhibited starch granules derived from the same base starch and processed under the same conditions.

Although any of a number of materials can be used as the binding agent, the present invention utilizes a starch-based binding agent due to its compatibility with starch granules, as well as the ability to create a product free of any non-starch material or chemicals. The starch-based binding agent used in coating or binding the starch granules together can be derived from any native starch. In one embodiment, the starch-based binding agent is derived from the same base native starch as the native starch granules that it binds together or agglomerates (e.g, both the starch granule and the starch-based binding agent are derived from waxy maize). In another embodiment, the starch-based binding agent is derived from a different base native starch than the native starch granules that it binds together or agglomerates (e.g, the starch granule is derived from waxy maize and the starch-based binding agent is derived from potato). As described above with respect to the starch granule, the starch-based binding agent can also optionally be buffered to adjust the pH of the starch granules.

In one embodiment, this starch-based binding agent can be either a physically modified or fully cooked starch which has not been subjected to any chemical modifications, resulting in a final agglomerated product that is still considered an 'unmodified' (i.e., not chemically modified) starch for regulatory purposes and accordingly given a clean label designation. These unmodified starch-based binding agents can be rendered cold water soluble or swellable by, for example, simultaneously cooking and drying the starch on hot drums or in spray driers. This cold water swellable starch may then be solubilized and at least partially dispersed in water or other aqueous medium, and then mixed with the starch granules to form the starch agglomerates. Preferably, the binding agent is at least partially cooked.

In a separate embodiment, the starch-based binding agent may optionally be subjected to chemical modification and pregelatinization. This chemically modified cold water swellable starch may then be dispersed or solubilized in water or an aqueous medium, and then mixed with starch granules to form the starch agglomerates, resulting in a chemically modified starch agglomerate. Non-limiting examples of chemical modification of the binding agent include crosslinking and substitution to improve stability.

Generally speaking, the starch used as the binding agent can be at least partially, preferably fully, cooked either native or modified (e.g., physically, enzymatically and/or chemically) starch. The starch binding agent may be at least partially dispersed in either water or a suitable buffer for maintaining the pH required for thermal inhibition. The amount of starch binding agent used to form the starch agglomerates is about 0.05 to about 50.0%, preferably about 0.1 to about 25.0%, and more preferably about 0.5 to about 15.0%, based on total weight of the starch granules. The choice of starch binding agent depends upon the properties required for the end product. The starch-based binding agent may be mixed with granular starch under semi-moist, or wet conditions at desired proportions in order to obtain a product having desired levels of agglomeration, particle size distribution, and stability. Product characteristics may also depend on the agglomeration process and equipment used.

Once the starch agglomerate is formed, it can be dehydrated by application of heat or any other appropriate method, including—but not limited to—air-drying, vacuum drying, freeze-drying, exposing to a desiccant, flash drying, or drum drying. Prior to this dehydration step, the starch slurry may be dewatered and/or dried, preferably to less than about 12% moisture dry solids basis (dsb). Such drying is to be distinguished from the dehydration step in which the starch agglomerates are at dehydrated to anhydrous or substantially anhydrous conditions. When starches are subjected to heat (e.g., about 125° C. or greater) in the presence of water, hydrolysis or degradation of the starch may occur. Therefore, the conditions for dehydration of the starch agglomerate should be chosen so that inhibition is favored over hydrolysis or degradation. Although any conditions meeting that criterion can be used, suitable conditions consist of dehydrating at low temperatures below 125° C. and/or raising the pH before dehydrating. Accordingly, the preferred dehydrating conditions consist of a combination of low temperature and neutral to basic pH.

Temperatures used to dehydrate the starch agglomerate are preferably kept at about 125° C. or lower, and more preferably at temperatures, or a range of temperatures, from about 100° to about 125° C. The dehydration temperature can be about 100° C. or lower, but a temperature of at least about 100° C. is more effective in removing moisture. Thermal dehydration can be carried out by heating the starch agglomerate in a conventional oven, forced air oven, fluid bed reactor/drier or any other heating device for a time and at a temperature sufficient to reduce the moisture content to about 5 wt % or less, preferably less than about 1 wt % (i.e., anhydrous or substantially anhydrous), based on total weight of the starch. In one embodiment, the moisture content is reduced to less than about 3%. "Substantially anhydrous" for the purpose of the present invention means that the water content of the starch agglomerate is about 5 wt % or less based on total weight of the starch agglomerate. "Anhydrous" means that the water content of the starch agglomerate is less than about 1% based on total weight of the starch agglomerate. All percent moisture figures are on a dry solid basis.

After dehydration, the starch agglomerate may be heat treated for an amount of time and at a temperature or range of temperatures effective to inhibit the starch. Preferred heating temperatures are about 100° C. or greater. For practical purposes, the upper temperature limit of the heat treatment is usually about 200° C., a temperature range at which highly inhibited starches can be obtained. Typically, heat treatment is carried out at about 125° C. to about 180° C., preferably about 140° C. to about 170° C., more preferably about 165° C. Time and temperature profile depend upon the level of inhibition desired. For example, when a conventional oven is used, the time to inhibit may range from about 1 to about 20 hours, typically about 2 to about 6 hours, and usually about 1.5 to about 4.5 hours. When a fluidized bed dryer/reactor is used, the time to inhibit may range from about 0 minutes (i.e., the inhibition occurs during the ramp up temperature) to about 10.0 hours, typically about 0.25 hours to about 4.0 hours. Longer times are required at lower temperatures to obtain more inhibited starches.

The dehydration and heat treating steps may be continuous and accomplished by applying heat to the starch agglomerate beginning at ambient temperature and then ramping the temperature up. In many cases, moisture is driven off and the starch agglomerate is anhydrous or substantially anhydrous before the temperature reaches the thermal inhibition temperature. After the starch agglomerate reaches an anhydrous or substantially anhydrous state, some level of inhibition may be attained before the final heat treatment temperature is reached. At these initial low levels of inhibition, the peak viscosities are typically higher than at inhibition levels reached with longer heat treating times, although there is greater breakdown in viscosity after the peak viscosity is reached. As duration of heat treatment increases, peak viscosities become progressively lower with less breakdown in viscosity.

As described above, the starch granules may optionally be modified and/or pH adjusted prior to mixing with the starch-based binding agent. The starch binding agent may be optionally, in any order, modified, at least partially if not fully cooked, and pH adjusted prior to mixing with the starch granules. The starch granules are mixed with the starch-based binding agent to form starch agglomerates, and these starch agglomerates are then thermally inhibited. Generally speaking, starch agglomerates are thermally inhibited by dehydrating the starch for a time and at a temperature sufficient to render the starch agglomerates anhydrous or substantially anhydrous. These anhydrous or substantially anhydrous starch agglomerates are then heat treated for a time and at a temperature sufficient to inhibit the starch agglomerates.

Starch base, dehydrating conditions, heating time and temperature, initial pH, and other variables during the process steps may affect the degree of inhibition obtained. All these factors are interrelated and these different variables have an effect on controlling the degree of inhibition, as well as the textural and viscosity characteristics of the inhibited products.

Removal of various proteins, lipids and other off-flavor components from both starch granules and the binding agent prior to thermal inhibition may improve the flavor (i.e., taste and aroma) of the resultant thermally inhibited starch agglomerates. Sodium chlorite extraction and ethanol extraction of the protein are useful methods of extraction. Other procedures which can be used for protein removal include washing the starch at an alkaline pH (e.g., pH 11-12) and/or treating the starch with proteases. Polar and non-polar solvents having an affinity for proteins and/or lipids can also be used. Any solvents used should be food grade solvents such as alcohols (e.g., ethanol or isopropanol) when the thermally inhibited starch agglomerates are to be used in food products.

Any appropriate equipment may be used for agglomeration, including blenders, homogenizers, mixers, fluid bed coating systems, fluid bed agglomerating systems, and any other suitable equipment which permits agglomeration to the desired level. Mixing method, mixing speed, temperature, amount of moisture, and the proportions of starch granules and hind agent are factors that affect the degree of agglomeration of starch granules. As noted previously, agglomeration refers to the clustering of two or more starch granules into an agglomerate by a binding agent and coating, either partially or completely, the remaining granules by the binding agent.

Generally, agglomeration of starch granules occurs by mixing the starch granules with a binding agent. In one embodiment, dry starch granules are mixed with the binding agent using an appropriate mixing device to create the agglomerated starch. The proportion of starch granules and starch binding agent depends upon the desired level of agglomeration and coating of granules. The binding agent may be applied by spraying, pumping or injecting it onto the starch granules while applying an appropriate mode of mixing these two constituents in order to form agglomerates.

In another embodiment, agglomeration is carried out by mixing wet starch granules with a starch binding agent, hi this wet agglomeration process, a slurry (comprising about 15.0 to about 90.0% moisture) of the starch granules and an appropriate amount of the starch binding agent may be prepared using an appropriate mixing device. The agglomerates are then dried, sieved, and used for the thermal inhibition process either with or without a particle size reduction. (i.e., grinding, milling) step after drying.

Agglomeration may also be carried out by spray drying a slurry containing the starch granules and the starch binding agent. This may be conducted with or without buffering to maintain a certain pH. For spray drying, the starch slurry may be made at a concentration of about 60% or less, preferably about 40% or less, and more preferably about 20% or less solids. Slurry concentration depends on both the desired end-product properties (e.g., degree of agglomeration) and the process conditions (e.g., viscosity of the slurry, ease of moisture removal, etc.).

The process steps performed in carrying out thermal inhibition of the starch agglomerate may occur at ambient pressure or higher pressure, and may be accomplished using any means known to starch practitioners. In one embodiment, the process steps are carried out by application of dry heat in air or in a modified gaseous environment, such as increased oxygen content air and may be conducted in a fluidized bed reactor or in any other suitable equipment capable of providing the required heating conditions for starch.

Useful equipment for dehydration and heat treatment thermal inhibition) include any industrial oven (e.g., conventional ovens, dextrinizers, fluidized bed reactors and driers, mixers and blenders equipped with heating devices, and other types of heaters). Particular if the dehydration step is to be conducted in the same equipment, the equipment may be fitted with a vent to atmosphere or some other dehumidifying mechanism so that moisture does not accumulate and precipitate onto the starch and/or otherwise modified to remove water vapor from it (e.g., by vacuum or blower for sweeping air from the head-space of the apparatus, by use of a fluidizing gas, or with a dehumidifying device). Heat treatment may be accomplished in the same equipment in which dehydration occurs, and most conveniently is continuous with the dehydrating step. When dehydration is continuous with heat treatment (e.g., in a fluidized bed reactor or drier), dehydration occurs while bringing the equipment up to the heat treatment temperature.

Thermally inhibited starch agglomerates having high viscosities with no or low percentage breakdown in viscosity are obtained in shorter times in the fluidized bed reactor than can be achieved using other conventional heating ovens. Fluid bed reactors/driers are intended to include in which the bed is mechanically fluidized as well as those in which the bed is fluidized by gas. Suitable fluidizing gases include air, which may be oxygen enriched, and nitrogen.

Conventional ovens may alternatively be used to inhibit starch agglomerates. The temperature of the oven should be adjusted to be from about 125° to about 200° C., preferably about 140° C. to about 170° C., and most preferably about 165° C. in order to obtain the thermally inhibited starch product. Depending upon the temperature selected, the batch size, the pH, the selection of starch or flour used and other factors, the heating process can be carried out over a time period of about 1 to about 20 hours. For example, at a temperature of 165° C., the heating step is preferably carried out for about 0.5 to about 6.0 hours.

The starch agglomerate may be screened or milled—either prior to thermal inhibition or after—to obtain a desirable particle size range. Size distribution of the agglomerated starches may be controlled by using appropriate screening methods (e.g., sieving to separate undesired particle sizes), using appropriate operating settings in special processing equipment used to agglomerate (e.g., granulators, fluidized bed mixers/dryers, Wurster mixer, Freund-Vector fluid bed mixer, CoriMix mixers, fluid bed agglomerators, or spray dryers) or any other method known in the art. Depending upon the process equipment employed, the prepared material can contain agglomerates of various sizes, including non-agglomerated starch granules that are at least partially coated with the binding agent.

Further, the pH of the starch agglomerates may be adjusted as desired. For example, the pH can be adjusted to the naturally occurring pH of the starch.

Considering the above described starch granules and binding agents and the processes for preparing the thermally inhibited starch agglomerates, such processes may be modified to obtain products having specific functional properties such as desired viscosity profiles and/or texture. These non-limiting process modifications or variations include
  a) agglomerating native, unmodified, non-pregelatinized starch granules with fully cooked and dispersed starch from the same starch base as the starch granules;
  b) agglomerating native, unmodified, non-pregelatinized starch granules with partially cooked and dispersed starch from the same starch base as the starch granules;
  c) agglomerating native, unmodified, non-pregelatinized starch granules with non-pregelatinized starch, having a substantially low gelatinization temperature, from a different starch base as the starch granules;
  d) agglomerating native, unmodified, non-pregelatinized starch granules with fully cooked and dispersed starch from a different starch base than that of the starch granules;
  e) agglomerating native, unmodified, non-pregelatinized starch granules with fully cooked and dispersed modified starch that is modified enzymatically and/or chemically;
  f) agglomerating modified (either physically or chemically) starch granules with fully cooked and dispersed native starch; or
  g) agglomerating modified (either physically or chemically) starch granules with fully cooked and dispersed modified starch that is modified enzymatically and/or chemically.

For all of the above exemplary options, pH adjustments can be performed using suitable buffer systems—on the starch granules, the binding agent, or both, depending on the properties and functionalities (e.g., paste viscosity) desired in the end product.

Agglomeration and granule coating prepared according to the processes described above and using the binding agent results in starch agglomerates having higher paste viscosities than comparable non-agglomerated thermally inhibited starch granules. The improvement in paste viscosity with the agglomerated thermally inhibited starches depends upon the amount of binding agent and the resultant degree of agglomeration, as well as other factors such as the degree of inhibition and starch source for both the granule and the binding agent. Accordingly, different levels of paste viscosities can be obtained by using various types and amounts of starch.

The higher achievable viscosity allows for a lower use of starch to achieve the same viscosity. Thus, less agglomerated, thermally inhibited starch may be used than if non-agglomerated, thermally inhibited starch was used. Thermally inhibited starch agglomerates may be blended with other unmodified or modified starches or with other food ingredients for use in a food product. Food products in which the thermally inhibited starch agglomerates are useful include thermally-processed foods, acidic foods, dry mixes, refrigerated foods, frozen foods, extruded foods, oven-prepared foods, stove top-cooked foods, microwaveable foods, full-fat or fat-reduced foods, and foods having a low water activity. Food products wherein the thermally-inhibited starches are particularly useful are foods requiring a thermal processing step such as pasteurization, retorting, or ultra-high temperature (UHT) processing.

Thermally inhibited starch agglomerates are particularly useful in food products in which a non-chemically cross-linked starch thickener, viscosifier, gelling agent, or extender is required. Based on processed food formulations, the practitioner may readily select the amount and type of thermally inhibited starch agglomerate required to provide the necessary thickness and gelling viscosity in the finished food product, as well as the desired texture. Typically, the starch agglomerate is used in an amount of about 0.1 to about 35%, most preferably about 2 to about 6% by weight of the food product.

Among the food products that may be improved by use of thermally inhibited starch agglomerates are high acid foods (pH<33) such as fruit-based pie fillings, baby foods, and the like; acid foods (pH 3.7-4.5) such as tomato-based products; low acid foods (pH>4.5) such as gravies, sauces, and soups; stove top-cooked foods such as sauces, gravies, and puddings; instant foods such as puddings; pourable and spoonable salad dressings; refrigerated foods such as dairy or imitation dairy products (e.g., yogurt, sour cream, and cheese); frozen foods such as frozen desserts and dinners; microwaveable foods such as frozen dinners; liquid products such as diet products and hospital foods; dry mixes for preparing baked goods, gravies, sauces, puddings, baby foods, hot cereals, and the like; and dry mixes for predusting foods prior to batter cooking and frying. Thermally inhibited starch agglomerates could be may be useful in preparing food ingredients such as encapsulated flavors and clouds.

Procedural

Characterization of Inhibition by Texture

Starches having a low to moderate degree of inhibition exhibit certain textural characteristics when dispersed in an aqueous medium and heated to gelatinization. In the following Examples, the samples were considered to be inhibited if a heated gelatinized slurry of the Sample exhibited a noncohesive, smooth texture.

Characterization of Inhibition by Brabender Viscosity Data

Characterization of thermally inhibited starch is made more conclusively by reference to a measurement of its viscosity after it is dispersed in water and gelatinized. The instrument used to measure paste viscosity is a Brabender® Micro Visco-Amylo-Graph® (manufactured by Brabender® GmbH & Co. KG, Duisburg, Germany). The Micro Visco-Amylo-Graph® records the torque required to balance the viscosity that develops when the starch slurry is subjected to a programmed heating cycle. For noninhibited starches, the cycle includes initiation of viscosity, usually at about 60° C. to about 70° C., with development of peak viscosity in the range of about 65° C. to about 95° C., and a breakdown in viscosity occurring when the starch is held at elevated temperature, usually about 95° C. The record consists of a curve or pasting profile tracing the viscosity through the heating cycle in arbitrary units of measurement termed Micro Brabender Viscosity Units (MVU).

Inhibited starches give a Brabender curve (pasting profile) different from the curve of the same starch that has not been inhibited (hereinafter referred to as the control starch). As the degree of inhibition increases, the peak viscosity and the breakdown in viscosity of the starch paste decrease. At appropriate levels of inhibition, the rate of gelatinization and swelling of the granules decreases, the viscosity breakdown disappears, and with prolonged cooking the pasting viscosity profile becomes a gradually rising curve.

In general, the peak viscosity of starch during pasting depends upon the ability of starch granules to swell and deform under applied shear without losing its overall structural integrity.

Characterization of Inhibition by Settling Volume/Solubility

Characterization of thermally inhibited starches may also be determined by the degree of granular swelling and solubility during cooking. Starches or agglomerated starch, after thermal inhibition, displays somewhat restricted granular swelling compared to non-inhibited, unmodified starch during cooking. This restricted swelling of thermally inhibited starches results in less starch material (i.e., polymers) being dispersed in the solution. Generally, highly thermally inhibited starch shows less granular swelling and less soluble content than a moderately or lightly thermally inhibited starch and will settle out more than the moderately or lightly thermally inhibited starch. Granular swelling can be determined by allowing cooked starch to settle in a graduated measuring cylinder. The height of the starch layer represents settling volume, which corresponds to the degree of granular swelling. The degree of solubility can be estimated by reading the concentration of starch material dispersed in the clear, top layer of liquid in the cylinder using a polarimeter.

EXAMPLES

The following examples more fully illustrate the embodiments of this invention. In the examples, all parts and percentages are given by weight and all temperatures are in degrees Celsius unless otherwise noted. The conditions used for pH adjustment, if any, and heat treatment are indicated. The time is the heating time at that temperature. When a zero hold time is indicated (e.g., 165° C./0 min), it means the sample is taken as soon as the material reaches that particular temperature (e.g., 165° C.). The initial pH of the starch prior to dehydration is indicated. Where the pH of the starch is adjusted, pH adjustment is done with potassium citrate unless specified otherwise.

Procedural

Sample Preparation

All starches used were granular and, unless indicated otherwise, were provided by Ingredion, Incorporated of Westchester, Ill. The controls for the test samples were from the same native sources as the test samples, and were at the same pH, unless indicated otherwise. All starches, both test and control samples, were prepared and tested independently, in replicates as appropriate.

The pH of the starch granule and/or binding agent was raised by slurrying the starch or binding agent in water at 5-40% solids as appropriate, and adding a sufficient amount of a buffer solution until the desired pH was reached.

All samples were oven dried or flash dried as conventional in the art (without gelatinization) to about 2 to about 15% moisture, based on total weight of the sample.

Measurements of pH, either before or after the thermal inhibition steps, were taken on samples consisting of one part anhydrous starch to four parts water.

Starch granules were (1) agglomerated using a pilot-scale CoriMix® CM-20 Mixer (available from Lödige, Paderborn, Germany), flash-dried and then thermally inhibited, (2) thermally inhibited and then agglomerated by making a slurry, followed by drying, grinding and sieving, or (3) spraying a slurry of soluble starch onto the starch granules with mixing to form agglomerates, followed by drying, thermal inhibition, grinding and sieving. The CoriMix® CM-20 Mixer allows for high speed, continuous intermixing of starch binding agent and starch granules into a homogeneous mixture. Accordingly, mixing together the starch binding agent and starch granules results in or forms moist starch agglomerates, which are subsequently flash dried.

Except where a conventional oven or other equipment is specified, the test samples were dehydrated and heat treated in a fluidized bed reactor, model number FDR-100, manufactured by Procedyne Corporation of New Brunswick, N.J. The cross-sectional area of the fluidized bed reactor was 0.05 sq meter. The starting bed height was 0.3 to 0.8 meter, but usually 0.77 meter. The fluidizing gas was air except where otherwise indicated and was used at a velocity of 5 to 15 meter/min. The sidewalls of the reactor were heated with hot oil, and the fluidizing gas was heated with an electric heater. The samples were loaded to the reactor and the fluidizing gas subsequently introduced, or were loaded while the fluidizing gas was being introduced. The samples were brought from ambient temperature to 125° C. until the samples became substantially anhydrous, and then were further heated to the specified heat treating temperatures. When the heat treating temperature was 165° C., the time to reach that temperature was less than three hours.

Moisture level of the samples at the final heating temperature was less than 1%, unless stated otherwise. Portions of the samples were removed and tested for inhibition at the temperatures and times indicated in the tables. These samples were tested for inhibition using the following pasting viscosity profile analysis procedure.

Paste Viscosity (Brabender MVA-U) Test Procedure

Unless otherwise stated, the following paste viscosity procedure was used. All samples were slurried in a sufficient amount of distilled water to give 6% anhydrous solids starch slurry. The pH was adjusted to pH 3.0 with a sodium phosphate, citric acid buffer and the slurry introduced to the sample cup of a Brabender® Micro Visco-Amylo-Graph® (Model U) fitted with a 110 mL canister. The starch slurry was heated rapidly to 95° C. and held for 15 minutes.

Using data from Brabender pasting profiles, inhibition was determined to be present if, when dispersed at 5 to 8% solids in water at 92° C. to 95° C. and pH 3 during the Brabender heating cycle, the Brabender data showed a continuous rising viscosity with no peak viscosity, indicating the starch was inhibited.

Settling Volume Test Procedure

Settling volume and solubility of test samples are measured by cooking the test sample starch particles (either agglomerated or non-agglomerated starch granules) and allowing them to settle in a 100 mL graduated cylinder over a specified period of time. The settling volume is then read (i.e., the volume reading of the starch layer in the graduated cylinder) and the concentration of solubles in the supernatant is determined using a polarimeter (Polarimeter Concentration Reading, or 'PCR'). The percent solubles is determined according to the following equation $$\% \text{ Solubles} = \frac{PCR \times [100 - (SV \times 0.62)]}{MS}$$

wherein SV is the settling or starch volume (mL), and MS is the mass of starch in dilution (g).

In the Examples below, the percent moisture is the initial moisture content, prior to the thermal inhibition process during which the starch is dehydrated and heat treated. As indicated above, as the starches are brought from ambient temperature up to the heating temperature, the starches become anhydrous or substantially anhydrous.

Particle Size Distribution

Particle size distributions of samples were evaluated by a laser diffraction particle size analyzer (Model LS™ 13 320 MW, Beckman Coulter®, Brea, Calif. USA) equipped with a dry cell. Ideal particle size of an agglomerated starch particle is approximately 20 to 30 μm; however, an occasional presence of considerably larger agglomerates (e.g., about 100 to 150 μm) is not uncommon for this type of product. Preferred agglomerate size can be obtained by either sieving out the larger agglomerates during the process, or by controlling process conditions (such as mixer speed, type of equipment used for agglomeration, and controlling the moisture level during mixing of the base starch and the soluble starch). Milling or grinding the agglomerates is another option for reducing particle size but typically not preferred due to risk of damage to the starch granules and agglomerates.

EXAMPLES

The following examples illustrate various methods of thermally inhibiting starches according to this invention from waxy maize starch granules and the results of the variations in the processes on viscosity and settling volume/solubility.

Example 1

Laboratory-Scale Production

Starch samples having various levels of starch binding agent and various amounts of buffer in either the starch binding agent and/or the starch granules were prepared according to the recipes in Table 1 below.

TABLE 1

Sample Recipes and Processes

| Sample | Amount of starch binding agent[1] (% w/w based on starch granules) | Amount of buffer in starch binding agent (% w/w based on starch granules) | Amount of buffer in starch granules[2] (% w/w based on starch granules) | Process/Remarks |
|---|---|---|---|---|
| A1 | 5.00 | 1.00 | 0.00 | Agglomerated (by mixing) and thermally inhibited |
| B | 5.00 | 0.00 | 1.20 | Agglomerated (by mixing) and thermally inhibited |
| C | 1.80 | 0.00 | 1.20 | Agglomerated (by spraying starch binding agent) and thermally inhibited |
| D | 0.00 | 0.00 | 1.20 | Thermally inhibited. No agglomeration. |
| E | 5.00 | 0.00 | 1.20 | Thermally inhibited and agglomerated |
| F[3] | 0.0 | 0.0 | N/A | Thermally inhibited starch granules (no binding agent/no agglomeration). |

[1]Starch binding agent was a commercially available cold water swelling starch derived from waxy maize (ULTRA-SPERSE ® A starch obtained from Ingredion Incorporated, Westchester, Illinois).
[2]Starch granules were waxy maize starch obtained from Ingredion Incorporated, Westchester, Illinois.
[3] Comparative non-agglomerated control thermally inhibited starch granules.

Each Sample was prepared based on the recipes and processes provided in Table 1 to demonstrate their effect on viscosity, as well as to compare thermally inhibited agglomerated starches against non-agglomerated thermally inhibited starches (i.e., Samples D and F). The Samples were prepared as follows.

Sample A1 was prepared by buffering the starch binding agent to a pH of 6.0 prior to mixing with waxy maize native starch granules. No pH adjustment was performed on the starch granules themselves. The pH-adjusted solubilized starch binding agent was then mixed together with the starch granules using a lab mixer by spraying the solubilized starch binding agent onto the starch granules while mixing. The resultant starch mixture was then dried using an oven maintained at 50° C. to form starch agglomerates and allowed to cool to room temperature. These starch agglomerates were subsequently dehydrated at 125° C. to anhydrous (i.e., less than 1% moisture) and then heated in a forced air oven (Model M 115, Binder GmbH, Tuttlingen, Germany) to 165° C. to inhibit the starch agglomerates.

Sample B was prepared by buffering the starch granules to a pH of 7.0 prior to mixing with the starch binding agent. No pH adjustment was performed on the solubilized starch biding agent. The starch binding agent was mixed together with the pH-adjusted starch granules. A high performance ring layer CoriMix® CM-20 mixer (Lödige Process Technology, Paderborn, Germany) was used to feed and mix together the starch binding agent and starch granules. The resultant starch mixture was then dried using an oven maintained at 50° C. to form starch agglomerates and allowed to cool to room temperature. These starch agglomerates were subsequently dehydrated at 125° C. to anhydrous (i.e., less than 1% moisture) and then heated in a forced air oven (Model M 115, Binder GmbH, Tuttlingen, Germany) to 165° C. to inhibit the starch agglomerates.

Sample C was prepared by buffering the starch granules to a pH of 7.0. No pH adjustment was performed on the starch binding agent. As noted by the recipe provided above, Sample C used less starch binding agent than Sample B when applying the starch binding agent onto the granules by spraying. The starch binding agent was mixed together with the pH adjusted starch granules using a lab mixer by spraying starch binding agent onto the starch granules while mixing. The resultant starch mixture was then dried using an oven maintained at 50° C. to form starch agglomerates and allowed to cool to room temperature. These starch agglomerates were subsequently dehydrated at 125° C. to anhydrous (i.e., less than 1% moisture) and then heated in a forced air oven (Model M 115, Binder GmbH, Tuttlingen, Germany) to 165° C. to inhibit the starch agglomerates.

Sample D was prepared by buffering the starch granule to a pH of 7.0 and subsequently dehydrating at 125° C. to less than 1% moisture and then heated in a forced air oven (Model M 115, Binder GmbH, Tuttlingen, Germany) to 165° C. to thermally inhibit the starch granules. No agglomeration was performed.

Sample E was prepared by buffering the starch granules to a pH of 7.0. This pH adjusted starch was then dehydrated at 125° C. to anhydrous (i.e., less than 1% moisture) and then heated in a forced air oven (Model M 115, Binder GmbH, Tuttlingen, Germany) to 165° C. to inhibit the starch granules. The resultant thermally inhibited starch was then mixed with the starch binding agent using a lab mixer by spraying starch binding agent onto the starch granules while mixing. The starch agglomerates were then dried using an oven maintained at 50° C. to form starch agglomerates and allowed to cool to room temperature.

Sample F was a non-agglomerated, thermally inhibited waxy corn starch prepared by a process in which pH adjusted (to maintain near neutral or slightly alkaline conditions) waxy maize starch granules are dry thermally inhibited in a fluid-bed reactor as described in U.S. Pat. No. 5,932,017 (Chiu et al. (1999). This process does not involve agglomeration of starch granules using a binding agent. No further modification was performed on the starch. No starch agglomerates were formed.

Each Sample was evaluated for paste viscosity. Results of the viscosity evaluations are illustrated by the pasting profiles in FIG. 1. From FIG. 1 it is seen that starch granules that are agglomerated and subsequently thermally inhibited (Samples A-C) have an unexpectedly higher paste viscosity versus starch granules that are thermally inhibited and subsequently agglomerated (Sample E). Further, thermally inhibited starch agglomerates wherein the binding agent is buffered and the starch granules are not resulted in a higher pasting viscosity than thermally inhibited starch agglomerates wherein the starch granules are buffered and the binding agent is not (Sample A v. Sample B). Reducing the amount of binding agent in the agglomerate resulted in a reduction of the viscosity (Sample B v. Sample C), yet still provided an unexpectedly higher viscosity over starch granules that are thermally inhibited and subsequently agglomerated (Sample C v. Sample E).

Figure 2:
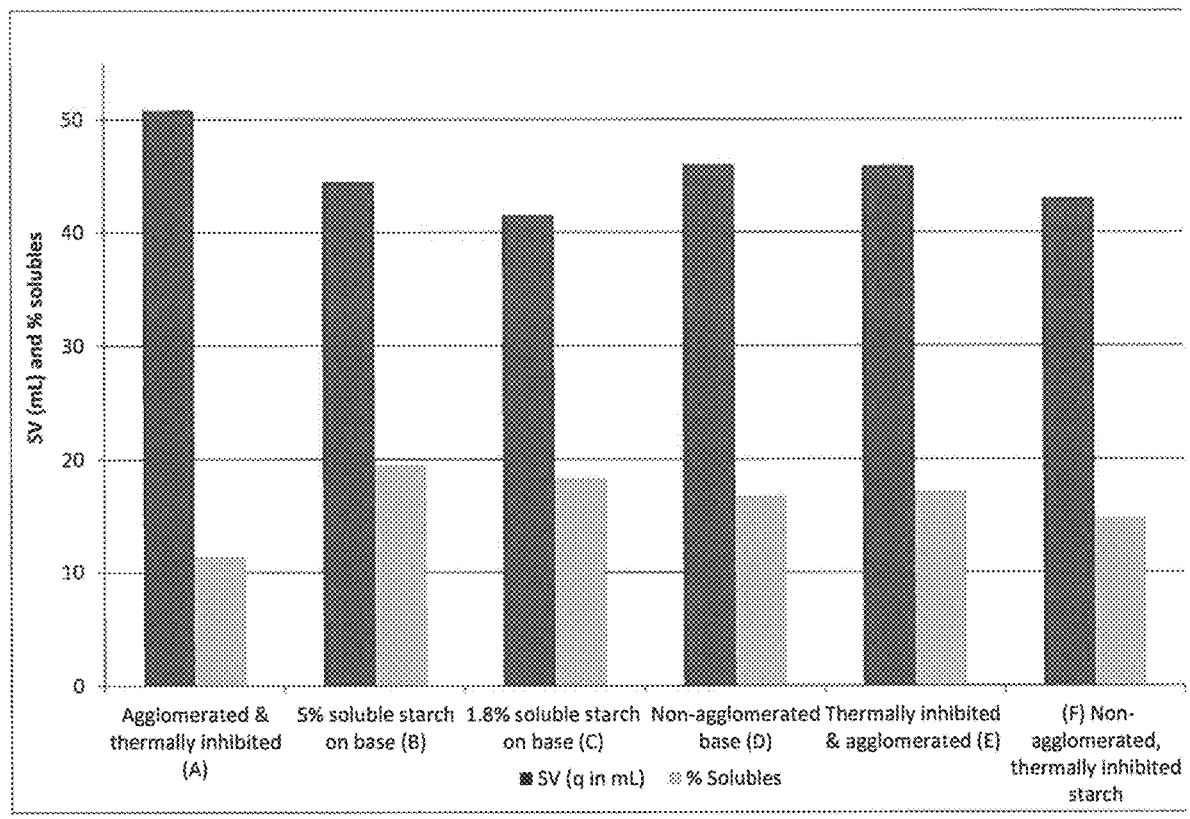
FIG. 2 is a bar chart illustrating settling volume (left bar for each sample) and percent solubles (right bar for each sample).

Each Sample in Example 1 was also evaluated for settling volume. All samples were cooked in boiling water for 20 minutes and allowed to settle for 48 hours in a 100 mL graduated cylinder in a pH 3.0 buffer. Results of the settling volume are illustrated in FIG. 2. Samples which had the higher settling volume ('SV') (column on the left for each Sample) and least amount of solubles (column on the right for each Sample) are desirable. From FIG. 2 it is seen that starch granules that are agglomerated using a buffered binding agent and subsequently thermally inhibited provided the best results (Sample A). Generally, the higher the SV the higher the granular swelling, resulting in higher pasting viscosity.

Each Sample was also evaluated for particle size distribution. The results were as follows

TABLE 2

| | Particle Size Distribution | | | |
|---|---|---|---|---|
| Sample | Peak 1 (μm) | Peak 2 (μm) | Median particle size (μm) | Remarks |
| A1 | 20 | 100 | 76 | Bimodal size distribution |
| B | 20 | 175 | 97 | Bimodal size distribution |
| C | 15 | 130 | 54 | Bimodal size distribution |
| D | 16 | 60 | 15 | Approximately unimodal distribution |
| E | 20 | 175 | 61 | Bimodal size distribution |
| F | 18 | 50 | 33 | Bimodal size distribution (overlapping peaks) |

The range of size distribution for Sample A1 (which provided the highest viscosity) is 6-300 μm with two peaks as shown in Table 2 above.

Example 2

Pilot Scale Production

Starch samples having 5% starch binding agent (based on weight of the starch granules) and various amounts of buffer in either the starch binding agent or the starch granules were prepared according to the recipes in Table 2 below,

TABLE 2

| | Sample Recipes and Processes | | | |
|---|---|---|---|---|
| Sample | Amount of starch binding agent[1] (% w/w based on starch granules) | Amount of buffer in starch binding agent (% w/w based on starch granules) | Amount of buffer in starch granules[2] (% w/w based on starch granules) | Process/Remarks |
| A2 | 5.00 | 1.00 | 0.00 | Aglomerated and then thermally inhibited |
| F [3] | 0.00 | 0.00 | N/A | Commercial reference |
| G | 5.00 | 0.00 | 2.00 | Agglomerated and then thermally inhibited |
| H [4] | 0.00 | 0.00 | 0.00 | Starch granules reference |

[1]Starch binding agent was a commercially available cold water swelling starch derived from waxy maize (ULTRA-SPERSE ® A starch obtained from Ingredion Incorporated, Westchester, Illinois),
[2]Starch granules were waxy maize starch obtained from Ingredion Incorporated, Westchester, Illinois.
[3] Comparative Sample F was a non-agglomerated waxy corn starch prepared as disclosed above.
[4] Comparative non-agglomerated control thermally inhibited starch granules.

Each Sample was prepared based on the recipes and processes provided in Table 2 to show their effect on viscosity. The Samples were prepared as follows.

Sample A2 was prepared by buffering the starch binding agent to a pH of 6.0 prior to mixing with the waxy maize native starch granules. No pH adjustment was performed on the starch granules themselves. The pH-adjusted starch binding agent was then mixed together with the starch granules. A high performance ring layer CoriMix® CM-201 mixer (Lödige Process Technology, Paderborn, Germany) was used to feed and mix together the starch binding agent and starch granules forming starch agglomerates. The resultant starch agglomerates were then flash dried using a pilot scale flash/ring dryer (GEA Barr-Rosin, Hudson, Wis. USA)

and allowed to cool to room temperature. These starch agglomerates were subsequently dehydrated at 125° C. to less than 1% moisture and then heated in an FDR-100 fluidized bed reactor (Procedyne Corp., New Brunswick, N.J., USA) to 165° C. to inhibit the starch agglomerates. Sample A2 is similar to Sample A1 above in the recipe used; however, Sample A2 is prepared using pilot-scale process equipment, whereas Sample A1 is prepared in the lab using lab equipment.

Sample F was the same non-agglomerated, thermally inhibited waxy corn starch described above. No starch agglomerates were formed. Sample F is provided again to illustrate the pasting profile of a non-agglomerated thermally inhibited starch against thermally inhibited starch agglomerates according to the present invention.

Sample C was prepared by buffering the waxy maize native starch granules to a pH of 7.0 prior to mixing with the solubilized starch binding agent. No pH adjustment was performed on the starch binding agent. The starch binding agent was then mixed together with the pH-adjusted starch granules. A high performance ring layer CoriMix® CM-20 mixer (Lödige Process Technology, Paderborn, Germany) was used to feed and mix together the starch binding agent and starch granules forming starch agglomerates. The resultant starch agglomerates were then flash dried using a pilot scale flash/ring dryer (GEA Barr-Rosin, Hudson, Wis. USA) and allowed to cool to room temperature. These starch agglomerates were subsequently dehydrated at 125° C. to less than 1% moisture and then heated in an FDR-100 fluidized bed reactor (Procedyne Corp., New Brunswick, N.J., USA) to 165° C. to inhibit the starch agglomerates.

Sample H was an unmodified native waxy maize starch obtained from Ingredion Incorporated, Westchester, Ill. to illustrate the pasting profile of native starch granules. No modification was performed on the starch. No starch agglomerates were formed.

Figure 3:
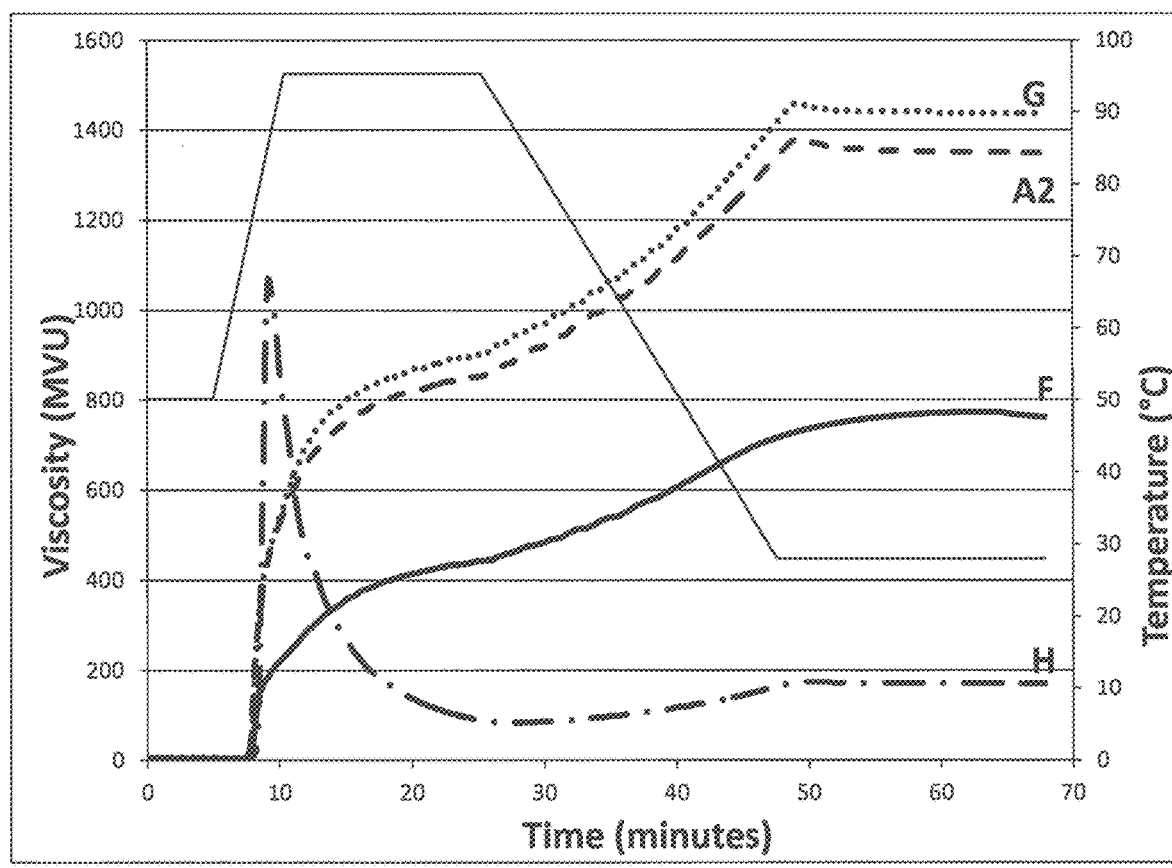
FIG. 3 is a graph illustrating Brabender pasting profiles of various starches prepared using a pilot-scale process.

Each Sample was evaluated for paste viscosity. Results of the viscosity evaluations are illustrated by the pasting profiles in FIG. 2. It was evident from the results that the pH adjustment of either the starch granules or the starch binding agent (coating and agglomerating agent) has an impact on the final pasting viscosity of the corresponding thermally inhibited starch. Regardless of the method of pH adjustment, agglomeration provides substantially higher paste viscosity compared to the non-agglomerated, thermally inhibited waxy corn starch control. From FIG. 3 it is seen that starch granules that are agglomerated and subsequently thermally inhibited (Samples A2 and G) have an unexpectedly higher paste viscosity versus control thermally inhibited starch granules that are not agglomerated (Sample F). Further, the results illustrate that pH adjustment of either the starch granules (Sample G) or the starch binding agent (Sample A2) has an impact on the final paste viscosity of the corresponding thermally inhibited starch.

Settling volumes and solubles of the thermally inhibited samples in this Example 2 were comparable to those of the thermally inhibited agglomerated samples discussed in Example 1.

In summary, starches agglomerated by binding starch granules using either a dispersed or solubilized starch as the binding agent, and then thermally inhibiting the starch agglomerates results in starch having a substantially higher paste viscosities than both (i) the same starch that is thermally inhibited and then agglomerated using the same binding agent and (ii) the same starch that is not agglomerated. The highest paste viscosities occur when the binding agent is pH adjusted prior to applying the agent to starch granules. The viscosity of the end product depends upon—in addition to the degree of thermal inhibition (time and temperature)—three main factors: (1) process used, (2) proportion or amount of binding agent used, and (3) distribution of buffer between the starch granule and the binding agent.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A method of increasing a viscosity of thermally inhibited starch comprising:
   forming a mixture comprising a starch binding agent, native starch granules, and a buffering agent, wherein the native starch granules are added to the starch binding agent; forming starch agglomerates from the mixture comprising, the starch binding agent, the native starch granules, and the buffering agent
   dehydrating the starch agglomerates to an anhydrous or substantially anhydrous state, and
   heat treating the anhydrous or substantially anhydrous starch agglomerates at a temperature of about 100° C. to about 200° C. for up to about 20 hours thereby thermally inhibiting the starch agglomerates;
   wherein references to the starch binding agent, the native starch granules, the thermally inhibited starch, and the starch agglomerates do not include flour; and
   wherein the starch binding agent is an at least partially solubilized but otherwise unmodified starch.

2. The method of claim 1, wherein the starch binding agent is at least partially solubilized in a buffering agent,
   thereby rendering the at least partially solubilized starch binding agent substantially neutral or slightly alkaline prior to mixing with the starch granules,
   wherein when rendered slightly alkaline the solubilized starch binding agent is at a pH in the range of 7.5-8.5.

3. The method according to claim 1, wherein the starch binding agent and the native starch granules are derived from the same native starch.

4. The method according to claim 1, wherein the starch binding agent and the native starch granules are derived from different native starches.

5. The method according to claim 1, wherein the native starch granules are waxy starch granules.

6. The method according to claim 1, further comprising dispersing the native starch granules in a buffer, thereby rendering the starch granules substantially neutral or slightly alkaline, prior to mixing with the starch binding agent, wherein when rendered slightly alkaline the native starch granules are at a pH in the range of 7.5-8.5.

7. The method according to claim 1, wherein the amount of the starch binding agent is about 0.05 wt % to about 50.0%, based on the weight of the native starch granules.

8. The method according to claim 1, further comprising adjusting the pH of the agglomerates to from 7.0 to 9.5 prior to the heat treating.

9. The method according to claim 1, wherein the thermally inhibited starch agglomerates have a higher viscosity than that of thermally inhibited, non-agglomerated, native starch granules derived from the same starch as the native starch granules in the starch agglomerates, the thermally inhibited native starch granules and thermally inhibited starch agglomerates having been thermally inhibited under the same conditions;

wherein the higher viscosity is determined by comparing the highest the peak viscosity obtained over the course of a pasting profiled measured by:
a) obtaining a slurry of 6% starch (anhydrous weight basis) in distilled water;
b) adjusting the slurry's to pH 3.0 and heating the starch slurry rapidly to 95° C.; and
c) holding the starch slurry at 95° C. for 15 minutes.

10. An agglomerated starch obtained according to the method of claim 1.

11. A food product comprising the agglomerated starch according to claim 10.

12. The method of claim 1, wherein the starch binding agent is formed by at least partially solubilizing a starch in a buffer,
thereby rendering the solubilized starch binding agent substantially neutral or slightly alkaline prior to mixing with the native starch granules,
wherein when rendered slightly alkaline the solubilized starch binding agent is at a pH in the range of 7.5-8.5,
wherein the amount of the starch binding agent is about 0.05 wt % to about 50.0% based on the weight of the native starch granules, and wherein the native starch granules are, waxy starch granules.

13. An agglomerated starch obtained according to the method of claim 12.

14. A food product comprising the agglomerated starch according to claim 13.

15. The method of claim 1 wherein a 5 to 8% solids content aqueous dispersion of the thermally inhibited starch agglomerates having pH 3, while being heated at 92° C. to 95° C. for 15 minutes, has
a. has a continuous rising viscosity with no peak viscosity during heating; and
b. a highest viscosity during the 15-minute heating time of at least about 800 MVU.

* * * * *